United States Patent
Stoodley

(10) Patent No.: US 7,937,695 B2
(45) Date of Patent: May 3, 2011

(54) REDUCING NUMBER OF EXCEPTION CHECKS

(75) Inventor: Mark Graham Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 11/741,428

(22) Filed: Apr. 27, 2007

(65) Prior Publication Data

US 2008/0271005 A1    Oct. 30, 2008

(51) Int. Cl.
  *G06F 9/45*     (2006.01)
  *G06F 9/44*     (2006.01)
(52) U.S. Cl. ............ 717/160; 717/128; 717/140
(58) Field of Classification Search .......... 717/139–143, 717/150, 158–162, 127–129
  See application file for complete search history.

(56) References Cited

U.S. PATENT DOCUMENTS

| | | | |
|---|---|---|---|
| 5,628,016 A | 5/1997 | Kukol | |
| 5,930,507 A * | 7/1999 | Nakahira et al. | 717/160 |
| 6,487,716 B1 * | 11/2002 | Choi et al. | 717/159 |
| 6,519,765 B1 | 2/2003 | Kawahito et al. | |
| 6,634,023 B1 * | 10/2003 | Komatsu et al. | 717/159 |
| 6,665,864 B1 | 12/2003 | Kawahito et al. | |
| 6,721,943 B2 * | 4/2004 | Krishnaiyer et al. | 717/150 |
| 6,738,976 B1 | 5/2004 | Meshenberg et al. | |
| 6,826,747 B1 * | 11/2004 | Augsburg et al. | 717/128 |
| 6,901,587 B2 * | 5/2005 | Kramskoy et al. | 717/154 |
| 6,928,642 B2 * | 8/2005 | Seelemann | 717/160 |
| 6,938,249 B2 * | 8/2005 | Roediger et al. | 717/160 |
| 6,986,131 B2 * | 1/2006 | Thompson et al. | 717/160 |
| 7,058,929 B2 * | 6/2006 | Charnell et al. | 717/135 |
| 7,058,935 B2 * | 6/2006 | Kawahito et al. | 717/151 |
| 7,080,366 B2 | 7/2006 | Kramskoy et al. | |
| 7,086,043 B2 * | 8/2006 | Roediger et al. | 717/150 |
| 7,103,882 B2 | 9/2006 | Kawahito | |
| 7,194,736 B2 * | 3/2007 | Shi et al. | 717/153 |
| 7,237,234 B2 * | 6/2007 | Granston et al. | 717/151 |
| 7,296,257 B1 * | 11/2007 | Dibble et al. | 717/127 |
| 7,404,183 B2 * | 7/2008 | Grcevski et al. | 717/160 |
| 7,552,428 B2 * | 6/2009 | Stoodley et al. | 717/148 |
| 7,818,729 B1 * | 10/2010 | Plum et al. | 717/140 |

(Continued)

OTHER PUBLICATIONS

Jung et al, "Efficient exception handling in Java bytecode to C ahead of time compiler for embedded systems", ACM EMSOFT, pp. 188-194, 2006.*

(Continued)

*Primary Examiner* — Anil Khatri

(74) *Attorney, Agent, or Firm* — Yee & Associates, P.C.; David A. Mims, Jr.

(57) ABSTRACT

Based on operations within an uncounted loop of source code, one or more calculations are generated for determining, at runtime, an expected number of iterations through which the uncounted loop can iterate before encountering an exception corresponding to at least one target exception check. A copy of the uncounted loop omitting each target exception check is generated. The uncounted loop, the copy of the uncounted loop, and the one or more calculations are arranged in compiled code so that at runtime program flow enters the copy of the uncounted loop. If a maximum number of iterations of the copy of the uncounted loop is reached, program flow proceeds from the copy of the uncounted loop to the uncounted loop. The maximum number of iterations is no more than the smallest member of a set consisting of the expected number of iterations for each target exception check.

21 Claims, 2 Drawing Sheets

U.S. PATENT DOCUMENTS

2002/0112227 A1 8/2002 Kramskoy et al.
2004/0019770 A1 1/2004 Kawahito
2004/0221281 A1 11/2004 Suganuma
2005/0097534 A1 5/2005 Clement et al.

OTHER PUBLICATIONS

Sundaresan et al, "Removing redundancy via exception check motion", ACM CGO, pp. 134-143, 2008.*

Mehrara et al, "Parallelizing sequential applications on commodity hardware using a low cost software transactional memory", ACM PLDI, pp. 166-176, 2009.*

Bruening et al, "Thread shared software code caches", IEEE CGO, pp. 1-11, 2006.*

Midkiff et al., "Optimizing array reference checking in Java programs", IBM Systems Journal, vol. 37, No. 3, pp. 1-29, retrieved Mar. 28, 2007. http://www.research.ibm.com/journal/sj/373/midkiff.html.

Odaira et al., "Sentinel Pre: Hoisting beyond Exception Dependency with Dynamic Deoptimization", International Symposium on Code Generation and Optimization (CGO'05), 2005, pp. 328-338.

"Method for Effcient Stack Usage using a Unique Stack Exception", IBM Technical Disclosure Bulletin, Oct. 1995, No. 10, vol. 38, pp. 183-184.

* cited by examiner

REDUCING NUMBER OF EXCEPTION CHECKS

BACKGROUND OF THE INVENTION

1. Field of the Invention

The present invention relates to compilation of computer program code, and more particularly to compilation which reduces the number of exception checks.

2. Description of the Related Art

Computer software comprises a set of instructions to be executed by a data processing system. Generally, computer software makes a data processing system useful, by providing the instructions for the data processing system to carry out productive tasks. Computer software provides instructions that enable a data processing system to function as, for example, a word processing device, spreadsheet device, or an Internet browsing device.

A wide variety of different data processing systems are capable of using computer software. Accordingly, as used herein, the term "data processing system" is intended to have a broad meaning, and may include personal computers, laptop computers, palmtop computers, handheld computers, network computers, servers, mainframes, workstations, cellular telephones and similar wireless devices, personal digital assistants and other electronic devices on which computer software may be installed. The terms "computer", "computer software", "computer program", "computer programming", "software", "software program" and related terms are intended to have a similarly broad meaning.

Generally, modern computer software is originally written in a computer programming language using syntactic constructs that are comprehensible by a programmer. The computer programming language represents the instructions embodied in the software. For example, in the "C" programming language, the syntactic term "print" is used to represent an instruction to the data processing system to print the contents of a particular data field.

These types of computer programming languages are useful because their syntactic constructs increase the ease with which programmers can create computer software, since the programmers do not need to compose instructions in a language that would be directly understood by the data processing system. Writing instructions in such a language would be far more difficult because such languages bear little or no resemblance to any human language.

A computer program, or a portion thereof, written with such a human-comprehensible programming language is generally referred to as "source code". Software developers can create source code either by directly authoring the source code (for example by entering the instructions into a text editor), or, more recently, by using specialized software programs that provide a specially designed user interface and that partially or substantially automate the generation of source code.

Instructions written in human-comprehensible source code, however, generally cannot be directly understood and implemented by a data processing system. Therefore, before a computer program written in human-comprehensible computer programming language (i.e. source code) may be used by a data processing system, the source code must first be "compiled" into language that will be understood by the target data processing system.

Compiling is a process, usually carried out by a computer program called a "compiler", in which a computer program (or a portion thereof) in an input computer language is transformed into compiled code, which may be in the same or a different computer language. In one exemplary compiling process, syntactic constructs of a human-comprehensible computer programming language are translated into instructions in a language that will be understood by the target data processing system (possibly through an intermediate software layer). In this example, the result of the "compiling" or "compilation" process is known as "executable code." Executable code is computer program code that can be executed by the data processing system either directly or by an intermediate software layer. Executable code is generally platform-specific, meaning that it can only be executed by a specific type of computer system. Accordingly, source code must generally be compiled in a specific way to be executed by a given type of computer.

Usually, a direct translation of a computer program written in a high level computer programming language into executable code will not result in particularly efficient executable code. There may be, for example, redundant operations, inefficient allocations of memory within the data processing system, and other circumstances which would impair the efficiency of the executable code. In addition, the order of instructions specified by the human programmer may not be the most efficient, or even nearly the most efficient, way to carry out the instructions on the data processing system.

To obviate these difficulties, various performance improvement algorithms are applied when compiling computer programs written in a high level computer programming language. The application of such performance improvement algorithms is referred to as "optimizing" or "optimization". As used herein, the terms "optimizing", "optimization", and related terms do not imply some form of actually optimal code in the sense that further improvement is not possible; rather, these terms mean that some form of performance improvement algorithm has been applied to the relevant code, even if further improvement is still possible.

For certain computer programming languages, such as Java™, the source code is first compiled into an intermediate form that can be implemented by an intermediate software layer, such as a Java virtual machine (hereinafter "JVM"). In Java, this intermediate form is known as "bytecode". (Java and all Java-based trademarks are trademarks of Sun Microsystems, Inc. in the United States, other countries, or both.) Typically, but not necessarily, the intermediate software layer will carry out additional compilation each time the computer program is run, usually to translate the intermediate form of the source code into executable code that can be directly executed by the data processing system. While the JVM itself is platform-specific, it enables any computer having a compatible JVM to execute a Java program that has been compiled into bytecode, without the Java program having to have been compiled in a platform-specific manner.

SUMMARY OF THE INVENTION

In one aspect, the present invention is directed to a computer implemented method for compiling a computer program to generate compiled code. Based on operations within an uncounted loop, the uncounted loop being a loop for which a number of iterations is not known before the loop begins executing, the uncounted loop contained in input code, the uncounted loop having at least one target exception check, one or more calculations is generated for determining, at runtime, for each of the at least one target exception check, an expected number of iterations through which the uncounted loop can iterate prior to the uncounted loop encountering an exception corresponding to a corresponding target exception check. A copy of the uncounted loop is generated, wherein one of the uncounted loop and the copy of the uncounted loop omits each of the at least one target exception check, and wherein another of the uncounted loop and the copy of the uncounted loop includes each of the at least one target exception check. The input code is compiled to form compiled code. The illustrative process also arranges, within the compiled code, the uncounted loop, the copy of the uncounted loop, and the one or more calculations so that at runtime a program flow will enter the one of the uncounted loop and the copy of the uncounted loop and, if a maximum number of iterations of the one of the uncounted loop and the copy of the uncounted loop is reached, the program flow will proceed from the one of the uncounted loop and the copy of the uncounted loop to the other of the uncounted loop and the copy of the uncounted loop, wherein the maximum number of iterations is no more than a smallest member of a set consisting of the expected number of iterations for each of the at least one target exception check.

In one embodiment, the uncounted loop contains an exit condition and the copy of the uncounted loop contains a copy of the exit condition. Within the compiled code, the uncounted loop, the copy of the uncounted loop and the one or more calculations are arranged so that, responsive to a determination within the one of the uncounted loop and the copy of the uncounted loop and prior to reaching the maximum number of iterations that the exit condition or the copy of the exit condition has been satisfied, the program flow proceeds past the other of the uncounted loop and the copy of the uncounted loop to an instruction intended for execution immediately following execution of the loop.

In one embodiment, the at least one target exception check is a single exception check. In another embodiment, the at least one target exception check is a plurality of target exception checks consisting of a subset of a larger plurality of exception checks contained in the uncounted loop. In a still further embodiment, the at least one target exception check consists of all exception checks contained in the uncounted loop.

In one embodiment, wherein the uncounted loop is an infinite loop and wherein exit from the other of the uncounted loop and the copy of the uncounted loop is controlled by the at least one target exception check. In one embodiment, the compiled code is executable code.

In one embodiment, the maximum number of iterations is smaller than the smallest of the set consisting of the expected number of iterations for each target exception check.

In other aspects, the present invention is directed to a data processing system and a computer program product for implementing the above methods.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
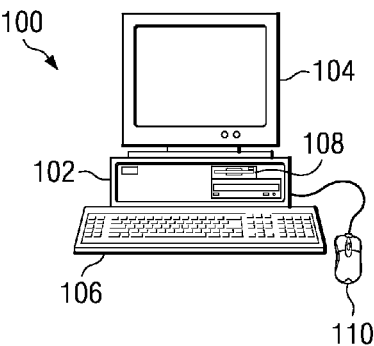
FIG. 1 is a pictorial representation of a data processing system in which aspects of the present invention may be implemented.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer™ computer or IntelliStation® computer, which are products of International Business Machines Corporation, located in Armonk, N.Y. Although the depicted representation shows a personal computer, exemplary aspects of the present invention may be implemented in other types of data processing systems, such as laptop computers, palmtop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

Figure 2:
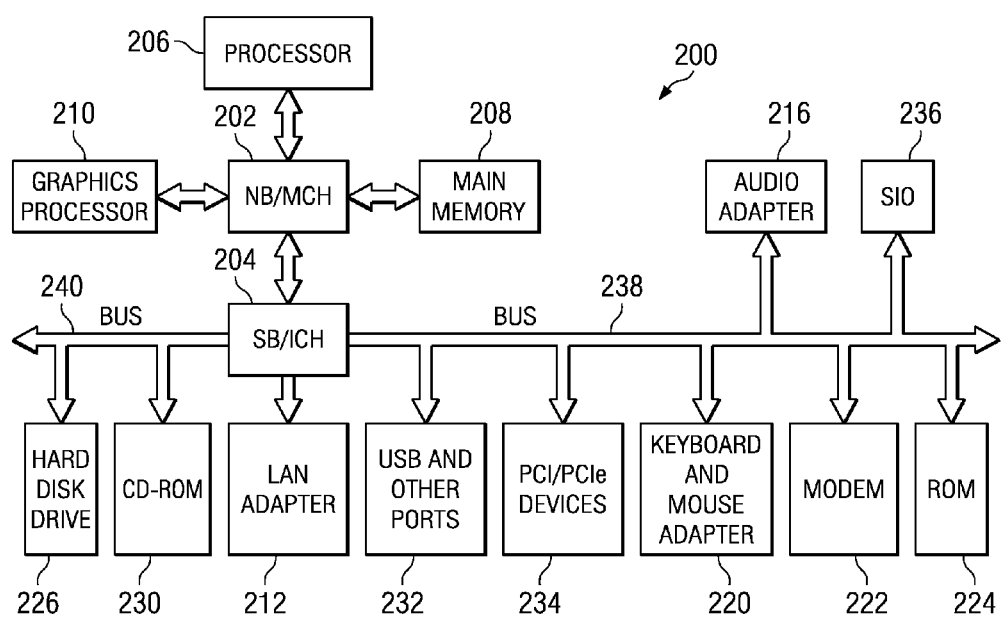
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200.

Instructions for the operating system, the object-oriented programming system, and applications or programs are located on storage devices, such as hard disk drive 226, and may be loaded into main memory 208 for execution by processor 206. Aspects of the present invention may be performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. For example, data processing system 200 also may be a tablet computer, laptop computer, or telephone device in addition to taking the form of a PDA.

One of the most beneficial features of computers is their ability to execute, with speed, accuracy, and precision far greater than a human could achieve, various repetitive tasks. A simple example of this is a loop. In programming, a loop is a statement or set of statements that is repeatedly executed (i.e. the statement or set of statements "loops" over and over again) until a certain condition or set of conditions is satisfied. For example, in the Java programming language, a loop could be:

```
int add_elements(int[ ] A) {
    int sum=0;
    for (int i=0;i < A.length;i++)
    sum += A[i];
    return sum;
}
```

EXAMPLE 1a

The loop in Example 1a above will calculate the sum of each of the elements of an array A. Specifically, the loop will first set the value of the integer "sum" to zero (the "int sum=0" instruction) and then, beginning at the first element A[0] of the array A (by setting the index counter "i" to zero using the "mint i=0" instruction), add the current value of that element to the integer "sum" (using the "sum+=A[i]" instruction) and then move to the next element of the array A (by incrementing the index counter "i" by 1 using the "i++" instruction) and add its value to the integer "sum", and so on, until all elements of the array have been considered.

The loop shown in Example 1a determines that all elements of the array have been considered by testing whether the index counter "i" is less than the length of the array (calculated by the "A.length" function) using the "i<A.length" test in the "for" loop. More particularly, a computer executing the loop will, "for" each case where the index counter "i" is smaller than the length (calculated by the "A.length" function) of the array A, add the value of the ith element of array A to "sum", and then increment the index counter "i" by one, thereby moving on to the $(i+1)^{th}$ element of array A, until the index counter "i" is equal to the length of the array A. The loop will then return the value of "sum", representing the sum of the values of all of the elements in array A.

To manually compute the results of a loop, such as that shown in Example 1a above, could (depending on the size of the array A) take a human several minutes or even hours. However, a modern computer can complete execution of the loop in Example 1a in less than a second. Typically, an individual loop will form a very small part of an overall computer program. The loop in Example A above is a few lines of code, whereas modern computer programs typically comprise hundreds of thousands or even millions of lines of code.

One of the features of the Java programming language is that the Java programming language enforces program correctness through a variety of checks that the Java Virtual Machine (JVM) must perform before executing a statement that might be meaningless or even dangerous. Such circumstances are referred to herein as "exception conditions". As used herein, the term "exception condition" refers to a condition which, if extant, makes iteration of the loop undesirable for any reason. For example, before an object reference is de-referenced to load one of the object's fields, the JVM must test the reference to see if the reference is null since loading from such a reference would be meaningless and might cause the JVM itself to crash. If a null reference is encountered by one of these checks, the JVM must cause a NullPointerException object to be created and the exception to be thrown without de-referencing the null reference.

Other examples of such exception checks are array bounds checks to verify that an array is not indexed outside of its allocated range and casting checks that verify that an object can be coerced to an expected type. An example where the latter variety might be required would be for a method invocation where each argument must be coerced to the type of its corresponding parameter. As noted above, the checks used to test for exception conditions are referred to herein as "exception checks." In an exception check, as the name implies, at each iteration of the loop, prior to executing the loop for that iteration, the computer checks whether the exception condition exists.

The Java specifications also mandate that exceptions are precise; that is, the program state that is visible to any catcher of the exception is precisely the state up to but not including the instruction that caused the exception. Accordingly, JVMs and Just-In-Time (JIT) compilers are permitted to execute the statements of a Java program in a different order than the programmer specifies, so long as the different order is not visible to the programmer. One consequence of this requirement is difficulty in moving statements above these exception checks since those moved statements likely alter the program state and so the state would be different when the exception is thrown. JVMs and JIT compilers are also forbidden to move one exception check above another exception check since a different exception might then be thrown by the reordered program.

The presence of these exception checks can have a significant negative effect upon a program's performance because the exception checks themselves take time to execute. Exception checks also hamper more powerful optimization by the JIT compiler. Moreover, these exception checks only rarely detect problems in the code of a commercial computer program (due to the generally thorough testing associated with such systems) so that the performance cost is paid even though such programs do not often perform steps that would generate an exception.

JIT compiler writers have developed a variety of techniques to reduce the number of exception checks performed by a Java program so that the performance drop associated with exception checks is significantly reduced. For example, if a reference has been checked against null once, the reference does not need to be subsequently checked again and again. A second example is array bound check elimination, which attempts to prove that a particular array reference can never index out of the array's boundaries. These techniques significantly reduce the cost of correctness checking in Java programs.

By way of illustrative example, the loop in Example 1a above is now shown with its implicit exception checks:

```
int add_elements(int[ ] A) {
    int sum=0;
    for (int i=0;i < A.length;i++) {
        NULLCHECK(A);
        BOUNDCHECK(A,i);
        sum += A[i];
    }
    return sum;
}
```

EXAMPLE 1b

As shown in Example 1b above, the Java language specification requires insertion/execution of implicit exception checks NULLCHECK(ref) and BOUNDCHECK(array,index) to ensure that "ref" (in this case the array A) is not a null reference (pointer) and that "index" (in this case the index counter "i") is within the bounds of "array". For example, undesirable results would occur if the index counter "i" were set to 100 when the array A contained only 50 elements. These exception checks are performed because of the A[i] reference inside the loop, so these exception checks are performed on every iteration of the loop.

As was noted above, exception checks require that the computer running the program devote time and processor resources to carrying out the exception check. Despite the speed of modern computers, carrying out exception checks for each iteration of a loop can have a significant adverse impact on performance. As was also noted above, in addition to the time spent by the processor to perform the check, exception checks can also have a secondary impact on loops in particular because the exception checks tend to inhibit the more powerful loop-based optimizations that can be carried out by an optimizing compiler. Accordingly, to the extent possible, the number of exception checks carried out during execution of a program should be minimized.

Removing the NULLCHECK is problematic because Java requires precise exception semantics, which means that the program state at the time of the exception must be precisely maintained. In particular, the NULLCHECK cannot be performed before the variable "i" is initialized to zero (for the loop) unless the programmer demonstrably cannot access that variable if the NULLCHECK fails. Usually the programmer demonstrably cannot access that variable if the NULLCHECK fails, but the traditional mechanism for getting around the aforesaid restriction where there may be a possibility that the programmer could access that variable if the NULLCHECK fails is to "peel off" one iteration of the loop. The term "peeling off" refers to placing copies of the statements inside the loop outside of the loop so that those statements will be executed one or more times, independent of the loop, before the loop begins to execute. An example of such peeling off is shown below (again, based on the loop in Example 1a above):

```
int add_elements(int[ ] A) {
    int sum=0;
    int i=0;
    if (i < A.length) {
        NULLCHECK(A);
        BOUNDCHECK(A,0);
        sum += A[0];
        i++;
        for (i < A.length;i++) {
            // BOUNDCHECK(A,i);
            sum += A[i];
        }
    }
}
```

EXAMPLE 1c

As can be seen in Example 1c above, the initialization of index counter "i" to zero, together with the addition of the value of the first $((i=0)^{th})$ element of the array A to "sum" (i.e. one iteration of the loop), have been "peeled" out of the loop shown in Example 1b (which was the same loop as shown in Example 1a except that the implicit exception checks were shown). One iteration of the expression "i++" has been peeled to the outside of the loop, so as to cause the loop to begin iterating from i=1 instead of i=0. One iteration of the "i<A.length" test has been peeled to the outside of the loop to prevent access to the array A if it is empty (in which case the length of array A would be zero so that the "i<A.length" test would not be satisfied). Thus, correctness of the overall result is preserved.

This peeling approach works because the result of the NULLCHECK will not change from iteration to iteration; either the reference is null in all iterations or the reference is non-null in all iterations. Accordingly, checking the reference once in the first iteration is sufficient to determine whether the reference will ever be null, and after the first iteration, continuing to check the reference is redundant.

However, circumstances exist where a JVM or JIT compiler cannot prove that the array bound checks (BOUNDCHECK in the example above) will never cause an exception. Proving this fact is impossible in such cases, because, for example, the number of times the loop iterates or the size of an array accessed inside a loop may be dynamic values that are not known until the loop executes.

Known techniques in Java exist which are capable of removing the BOUNDCHECK in certain such situations. S. P. Midkiff, J. E. Moreira, and M. Snir in "Optimizing array reference checking in Java programs", IBM Systems Journal, Volume 37, No. 3, p. 409 (1998) describe a technique whereby, for counted loops, a compiler will attempt to prove that no exception will occur within any of the expected iterations. As used herein, the term "counted loops" refers to loops for which the number of iterations is, or will be, known before the loop begins executing, regardless of whether the number of iterations is determined at compile time or run time. If the compiler can successfully prove to itself that no exception will occur within any of the expected iterations, then the compiler will remove the relevant exception check.

Midkiff et al. also describe a technique that is applicable to counted loops in certain instances where a Java compiler cannot prove at compile time that no expected iteration will encounter an exception condition. According to this technique, two versions of the loop are created: a "fast" loop which contains no exception checks and a "slow" loop that is identical to the original loop (and therefore includes the exception checks). The original loop is replaced by these two loops and a series of conditions are inserted to determine whether execution of the fast loop is safe.

In the example above, the original loop (Example 1a) contains a reference to A[i], where i is the index variable for the loop (which iterates from 0 to a dynamic trip count N). Were the technique of Midkiff et al. applied to the loop in Example 1a, execution would be directed to the fast loop because the JVM or JIT compiler can determine that the condition "if (N<A.length)" will not cause the array bound check to throw an exception. In other cases, a program may include multiple array accesses or other statements requiring checks, so that the program also includes a complex nest of conditions that gate the path leading to the fast loop version. If any of the checks fail, then the original version of the loop will execute since one or more of the checks may throw exceptions.

These tests will determine, at runtime, whether one of the removed exception checks might encounter an exception condition in one of the loop iterations and throw an exception. If no such exception condition is expected to be encountered, the code containing the tests will direct program flow to the fast loop (the copy of the loop that omits the exception checks) which should result in improved performance. Moreover, the fast loop can often be further optimized by the compiler to achieve even further improved performance. Program correctness is preserved because, in the event that the inserted code determines that an exception might occur, program flow is directed to the original loop, so that any such exception will be thrown in the appropriate place.

This technique described by Midkiff et al. is referred to as "loop versioning", and is generally effective because typically no exceptions will be thrown. Their technique is general in that it can deal with multi-dimensional arrays and multiple levels of nested loops. However, the loop versioning technique described by Midkiff et al. only takes into consideration counted loops. As noted above the term "counted loops" as used herein refers to loops for which the number of iterations is, or will be, known before the loop begins executing, regardless of whether the number of iterations is determined at compile time or run time. The loop in Example 1a above is a counted loop because the value of A.length, which determines the number of times the loop will iterate, will be known before the loop begins executing. If the number of iterations is not known, however, the loop versioning technique of Midkiff et al. cannot be applied.

In addition, Rei Odaira and Kei Hiraki, in "Sentinel PRE: Hoisting beyond Exception Dependency with Dynamic Deoptimization", CGO, pp. 328-338, International Symposium on Code Generation and Optimization (CGO'05), 2005, describe a Partial Redundancy Elimination (PRE) intended to overcome difficulties associated with ordering constraints which must be preserved between excepting instructions. Their technique is arguably somewhat redundant in view of the loop versioning method of Midkiff et al. described above, because loop versioning enables elimination of many of the dependencies to which the technique of Odaira et al. is directed. As in the case of Midkiff et al., Odaira et al. also do not address the issue of uncounted loops. As used herein, the term "uncounted loop" refers to a loop for which the number of iterations is not known before the loop begins executing. As used herein, the term "counted loop" refers to a loop for which the number of iterations is, or will be, known before the loop begins executing, regardless of whether the number of iterations is determined at compile time or run time.

As noted above, the techniques of Midkiff et al. and Odaira et al. are applicable only to counted loops; that is, they rely on being able to know the number of iterations that the loop will execute before the loop executes. Not all Java loops fall into this category. The iteration count for a 'while' loop, for example, is not typically known until the loop has completed executing. Nonetheless, such loops may access arrays, in which case bound checks will be required on each loop iteration even if the code is properly written to remain within the size of the array.

According to an embodiment of an aspect of the present invention, a number of initial iterations that can be "peeled" away from the loop will be determined, where it can be proven that the checks contained in the loop will not, for those iterations, cause exceptions to be thrown. In other words, a "fast" copy of the loop, with the exception checks omitted, will be generated. The fast copy of the loop will iterate over a determined number of "safe" iterations. If the loop has not exited once these safe iterations are complete, then the original "slow" loop, which contains all checks that cannot be proven redundant using known techniques, is executed so that if an exception should be thrown, it will happen at the appropriate time and with the right program state. In this way, loops that execute correctly will have a reduced performance penalty associated with the correctness checks, but an incorrect execution will always cause an exception in exactly the same way as the original program.

Figure 3:
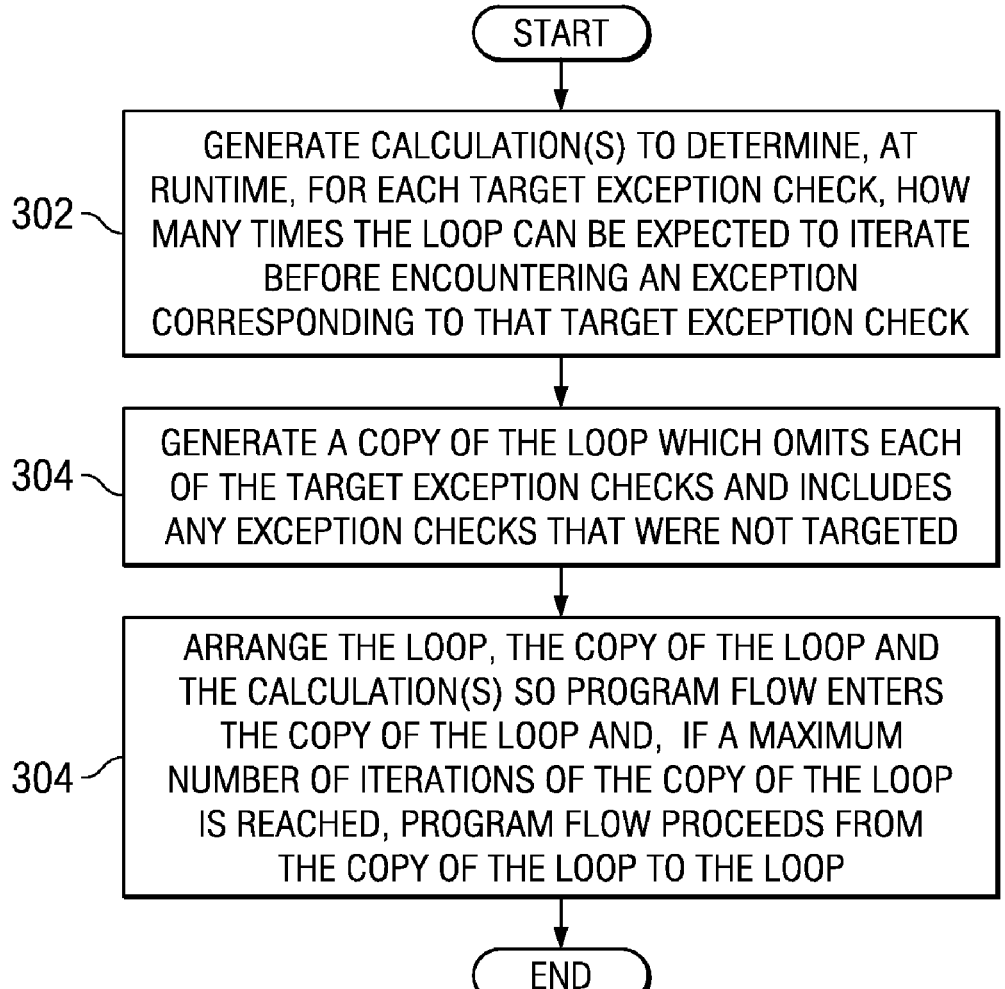
FIG. 3 is a flow chart showing an exemplary method according to an embodiment of an aspect of the present invention.

With reference now to FIG. 3, a method for compiling a computer program to generate compiled code according to an embodiment of an aspect of the present invention is shown generally at 300. The method 300 is preferably computer implemented, and operates on an uncounted loop contained in input code, which may be source code, intermediate code, or executable code. As noted above, an uncounted loop is a loop for which the number of iterations is not known before the loop begins executing. The uncounted loop includes at least one target exception check. As used herein, the term "target exception check" refers to an exception check that is targeted for removal (that is, omission from the "peeled", "fast" copy of the loop) in accordance with an aspect of an embodiment of the present invention. Accordingly, where a loop contains a plurality of exception checks, only some (or only one) may be target exception checks, and other exception checks will not be targeted for removal. Thus, there may be a single target exception check, or there may be a plurality of target exception checks. If there is a plurality of target exception checks, the plurality of target exception checks may comprise all exception checks contained in the loop, or may comprise a subset of a larger plurality of exception checks contained in the loop.

At step 302, based on operations within the uncounted loop, the method generates one or more calculations for determining, at runtime, an expected number of iterations through which the uncounted loop can iterate prior to the uncounted loop encountering an exception. More particularly, the calculation (or calculations) will determine, for each target exception check, how many times the uncounted loop can be expected to iterate before encountering an exception corresponding to that target exception check.

At step 304, the method generates a copy of the uncounted loop. In the embodiments shown, the copy of the uncounted loop omits each of the target exception checks, but will still contain any exception checks that were not targeted. Alternatively, the copy of the uncounted loop may retain each of the target exception checks, in which case each target exception check would be deleted from the original uncounted loop so that the original uncounted loop omits each of the target exception checks. For ease of reference, the examples used herein will be limited to the former case (where the copy of the uncounted loop omits the target exception checks). However, the latter methodology (where the copy retains or includes the checks and the original uncounted loop omits the checks) may be employed, with appropriate modifications, without departing from the scope of the present invention.

At step 306, the method arranges, within the compiled code, the uncounted loop, the copy of the uncounted loop and the calculation (or calculations) so that at runtime program flow will enter the copy of the uncounted loop and, if a maximum number of iterations of the copy of the uncounted loop is reached, program flow proceeds from the copy of the uncounted loop to the uncounted loop. The maximum number of iterations is a number set to be no more than the smallest member of the set consisting of the expected number of iterations for each target exception check. Thus, the copy of the uncounted loop will iterate until some point prior to the first expected exception corresponding to one of the omitted target exception checks, after which program flow will proceed to the uncounted loop, which contains the target exception checks and will be able to throw the expected exception if (or when) it is encountered. While the maximum number of iterations is preferably set equal to the smallest member of the set of expected numbers of iterations for performance reasons, the maximum number of iterations may optionally be set to some number that is smaller than the smallest member of the set of expected numbers of iterations in order to provide a margin of safety.

In one embodiment of an aspect of the present invention, the original uncounted loop contains an "exit condition", which is a test for determining when program flow will cease iteration within a loop and proceed to the next instruction. In such embodiments, the copy of the uncounted loop will also contain the exit condition. Strictly speaking, the copy of the uncounted loop will contain a copy of the exit condition; however, the effect is the same because the copy of the exit condition will be identical to the exit condition, so it will be the same test that must be satisfied, whether to exit the (original) uncounted loop or the copy of the uncounted loop. The compiled code, the uncounted loop, and the copy of the uncounted loop will be arranged so that, upon determination, within the copy of the uncounted loop and prior to reaching the maximum number of iterations, that the exit condition has been satisfied, program flow will proceed past the uncounted loop to some instruction that is intended by the programmer to be executed immediately following execution of the respective loop.

In another embodiment, the uncounted loop may be an infinite loop, exit from which is controlled by one of the exception checks. In such an embodiment, the copy of the uncounted loop will iterate for the maximum number of iterations. Then, program flow will proceed from the copy of the uncounted loop to the original loop so that, when an exception is encountered, program flow will be within the original uncounted loop. The original uncounted loop contains the exception check corresponding to the encountered exception. Thus, iteration of the infinite loop can cease.

The uncounted loop, as it appears in the compiled code, will likely have undergone a transformation from its original input code form as part of the compilation process. For example, in the case of Java bytecode code, the uncounted loop will usually be transformed from Java bytecode code into native code by a JIT compiler. The copy of the uncounted loop may be generated originally in the input code form, in which case the copy of the uncounted loop will likely undergo transformation as well, or, alternatively, the copy of the uncounted loop may originally be generated in compiled form.

Particular examples of exemplary implementations of aspects of the present invention will now be described.

Consider the following loop. The loop iterates an unknown number of times. In other words, the number of loop iterations is unknown before the loop begins executing. This kind of loop is therefore an uncounted loop. This loop accesses two arrays A and B via a variable i that is incremented inside the loop:

```
while (!exitCondition) {
    BOUNDCHECK(i+C,A);
    BOUNDCHECK(i+D,B);
        = A[i+C]-B[i+D]; // C,D are constant values
    i++;
    otherCode( );
}
```

EXAMPLE 2a

In the loop in Example 2a above, exitCondition represents an expression having any level of complexity. This expression determines when the loop will stop iterating (the "!" indicates "not", so the loop will continue to iterate "while" exitCondition is "not" satisfied). The BOUNDCHECK(i,ARRAY) (in this particular case, BOUNDCHECK(i+C,A) and BOUNDCHECK(i+D,B)) operation represents an exception check performed automatically by the JVM on array accesses. It verifies that i has a value between 0 and ARRAY.length (the function ARRAY.length, as noted above, returns the length of an array provided to the function as input). If i has a value outside that range, a new ArrayIndexOutOfBoundsException object is thrown. Although BOUNDCHECK looks like Java code, the BOUNDCHECK operation really represents an implicit action performed by the JVM when it evaluates the A[i+C] or B[i+D] references. However, the BOUNDCHECK operation has been made explicit in the code in Example 2a above in order to demonstrate how a transformation in accordance with an exemplary implementation of an aspect the present invention can improve performance of the code in the common case where the BOUNDCHECK would not throw the exception. JIT compilers routinely introduce these explicit checks so that redundant checks can be more easily identified and removed.

After applying a transformation in accordance with an exemplary implementation of an aspect the present invention to the loop in Example 2a above, the result would be the following:

```
// initially, i may not be 0; may even be negative
    N=i;
    if (i >= -C && i >= -D) {
        N = min(A.length-C, B.length-D);
        for (; i < N;) {       // FAST loop, no checks
            if (exitCondition)
                break;
            //BOUNDCHECK(i+C,A);
            //BOUNDCHECK(i+D,B);
                = A[i+C]-B[i+D];
            i++;
            otherCode( );
        }
    }
    if (i == N) {
        while (!exitCondition) { // SLOW loop, has checks
            BOUNDCHECK(i+C,A);
            BOUNDCHECK(i+D,B);
                = A[i+C]-B[i+D];
            i++;
            otherCode( );
        }
    }
}
```

EXAMPLE 2b

The resulting transformed code has been expressed in Java source code, with the addition of the BOUNDCHECK actions described earlier. The copy of the uncounted loop, referred to as the FAST loop in the code comments, appears in bold typeface in Example 2b. A JIT compiler that does not incorporate any facility to automatically apply this transformation but that does apply traditional array bounds check elimination would likely be able to use that traditional analysis to eliminate the BOUNDCHECK actions in the copy of the uncounted loop. For this reason, the BOUNDCHECK actions in the copy of the uncounted loop are shown as comments rather than as statements (as they appear in the original and slow (original copy) loops). While the uncounted loop in Examples 2a and 2b above involves an array index which increases as the loop executes, one skilled in the art will, once informed by the disclosure herein, appreciate that a similar transformation can be made if the array index variable decreases as the uncounted loop executes rather than increasing as in the example shown.

Example 2b, representing a transformation of the source code from Example 2a, has been expressed in Java source code in order to facilitate understanding. In practice, transformations in accordance with embodiments of aspects of the present invention would typically be made as part of the process of compiling source code into an executable form (e.g. Java bytecode), which is typically an automated process. This automated process is often carried out by a JIT compiler. Since the JIT compiler does not have to express the transformation in Java source code, the JIT compiler can transform the code of the original loop in Example 2a above in a slightly more efficient way:

```
if (i >= -C && i >= -D) {
    N = min(A.length-C, B.length-D);
    for (; i < N;) {       // FAST loop, no checks
        if (exitCondition)
            goto Lend;
            = A[i+C]-B[i+D];
        i++;
        otherCode( );
    }
}
while (!exitCondition) { // SLOW loop, has checks
    BOUNDCHECK(i+C,A);
    BOUNDCHECK(i+D,B);
        = A[i+C]-B[i+D];
    i++;
    otherCode( );
}
Lend:
```

EXAMPLE 2c

The main difference between this version of the transformed code (Example 2c) and the earlier version of the transformed code (Example 2b) is that, when exitCondition becomes true in the copy of the uncounted loop (fast loop), program flow directly jumps to the label Lend which follows the slow code. Since the copy of the uncounted loop, shown in bold typeface, now directly skips over the original loop, program flow avoids the redundant exitCondition test and the i==N tests along the exits from the copy of the uncounted loop. In fact, a typical JIT compiler equipped with optimizing functionality will probably rearrange the code in the example to make it even more efficient by transforming the copy of the uncounted loop into a do . . . while loop and then outlining the original copy loop as follows:

```
if (i < -C) goto LslowLoop;
if (i < -D) goto LslowLoop;
N = min(A.length-C, B.length-D);
if (!exitCondition) {
    // rotated so that exitCondition test at end
    do {
            = A[i+C]-B[i+D];
        i++;
        otherCode( );
    } while (!exitCondition && i < N);
}
Lend:
// whatever code follows the original loop
...
// outlined to the bottom of the method:
LslowLoop:
while (!exitCondition) { // SLOW loop, checks
    BOUNDCHECK(i+C,A);
    BOUNDCHECK(i+D,B);
        = A[i+C]-B[i+D];
    i++;
    otherCode( );
}
goto Lend;
```

EXAMPLE 2d

The loop from the original source code in Example 2a above contains 2 array accesses (one for array A, and one for array B). In the transformed code shown in Example 2d, the two array accesses have resulted in two conditions, gating entry to the copy of the uncounted loop (the fast loop) (i>=-C and i>=-D) as well as two terms in the expression to compute the number of safe iterations (A.length−C and B.length−D). The conditions and the safe iterations expression can be generalized to accommodate any number of array accesses, although larger numbers of conditions will result in a higher cost to enter the copy of the uncounted loop. Thus, large numbers of conditions will reduce the performance benefit to execute the "fast" copy of the uncounted loop.

The optimizing functionality included in many JIT compilers can also improve the efficiency of the tests in some cases. If, in the case of Example 2d above, the JIT compiler knows at compile time that C is 5 and D is 6, then the gating condition can be simplified to only test whether i>=−5 since this test subsumes the result of i>=−6. If the A and B arrays are known to alias to the same array, or all the array accesses inside the loop are known to index into the same array, then the expression to compute the number of safe iterations can also be simplified automatically by an optimizing JIT compiler to improve the performance of the generated code. Thus, embodiments of aspects of the present invention may not only result in performance improvements in and of themselves, they may also enable further performance improvements by transforming the code into arrangements to which additional optimizations may be applied.

Methods according to embodiments of aspects of the present invention need not be limited to uncounted loops where the array is indexed by a variable that is updated each time the uncounted loop iterates, but can also be applied to loops where the variable used to index the array is only periodically updated. In the particular case where the i variable is only updated on some paths through the uncounted loop, embodiments of aspects of the present invention are effective because the copy of the uncounted loop (fast loop) exits when i becomes equal to N. If i is incremented only periodically then the copy of the uncounted loop can simply iterate a greater number of times before exiting to the original copy loop.

If the variables used in the uncounted loop are not monotonically changing in the uncounted loop (i.e. if the variable can increment by a different amount depending on the circumstances), embodiments of aspects of the present invention can still be applied, although the overall performance benefit may be reduced. The particular type of transformation to be used will depend on where the update to the index variable is located in the uncounted loop relative to the array reference itself. If the update follows the array reference, then the exit condition for the uncounted loop can be augmented with an exception check to verify that the index expression will not cause the array reference to throw an exception. If the array reference follows the update, then the exception check must be inserted at the point of the update along with a jump to the appropriate location in the original copy loop (i.e. the point just following the update). This type of transformation can be used to enlarge the number of loops to which embodiments of aspects of the invention can be effectively applied, and is illustrated in the example below.

More particularly, the uncounted loop below contains two updates to a variable i used to index an array index A[i]. One of the updates is conditional (condition1) and occurs ahead of the array reference while the second update occurs after the array reference, also conditionally (condition2) but not necessarily under the same condition as the first update (i.e. condition1 need not be the same as condition2).

```
while (!exitCondition) {
    if (condition1)
        i = f( );
    BOUNDCHECK(i, A);
    = A[i];
    if (condition2)
        i = g( );
}
```

EXAMPLE 3a

This form of uncounted loop has traditionally been a difficult one for bounds check elimination because the updates to the i variable are not guaranteed to be monotonic and may not even occur during a particular execution of the loop. Nonetheless, this situation can also be dealt with by embodiments of aspects of the present invention, although the methodology required is more complex than for the examples introduced earlier. An exemplary transformation of the code in Example 3a above is now shown, according to an embodiment of an aspect of the present invention:

```
if (!exitCondition) goto Lexit;
Lenter:
if (i < 0 || i > A.length) goto LslowEnter;
LfastEnter:
if (condition1) {
    i = f( );
    if (i < 0 || i >= A.length) goto Lslow1;
}
    = A[i];
if (condition2) {
    i = g( );
    goto Lenter:
}
if (!exitCondition) goto LfastEnter;
Lexit:
...
// code normally following original loop
...
// outlined slow loop with second entry
LslowEnter:
while (!exitCondition) {
    if (condition1)
        i = f( );
Lslow1:
    BOUNDCHECK(i,A);
    = A[i];
    if (condition2)
        i = g( );
}
```

EXAMPLE 3b

The copy of the uncounted loop (fast loop) in the transformed code in Example 3b, shown in bold typeface, resembles a nested loop because there are two different back-edges corresponding to the labels Lenter and LfastEnter. The loop is therefore more complicated for the optimizing functionality of a JIT compiler to handle, but the removal of the BOUNDCHECK from the common path through the loop and the optimizations enabled by that removal may compensate for the additional complexity in the loop structure. Suitable functionality may be added to an optimizing compiler to enable the compiler to calculate whether the optimizations enabled by removal of the BOUNDCHECK from the common path through the loop may compensate for the additional complexity in the loop structure so as to determine whether or not to carry out the transformation in any particular case.

In the particular example shown (that is, Example 3a as transformed into Example 3b), because the variable i is not incremented if condition1 and condition2 are both false, there is no limit to the number of iterations that can execute safely; so long as the value of the index variable i does not change, the copy of the uncounted loop will execute indefinitely. A more likely scenario, however, is that the index variable i is incremented whenever condition1 and condition2 are false, as shown in the example below:

```
while (!exitCondition) {
    if (condition1)
        i = f( );
    BOUNDCHECK(i, A);
        = A[i];
    if (condition2)
        i = g( );
    i++;
}
```

EXAMPLE 4a

In such a scenario, the code in Example 4a above would be transformed as follows:

```
if (!exitCondition) goto Lexit;
Lenter:
if (i < 0) goto LslowEnter;
N=A.length;
LfastEnter:
if (i >= N) goto LslowEnter;
if (condition1) {
    i = f( );
    if (i < 0 || i >= A.length) goto Lslow1;
}
    = A[i];
if (condition2) {
    i = g( );
    goto Lenter:
}
i++;
if (!exitCondition) goto LfastEnter;
Lexit:
...
// code normally following original loop
...
// outlined slow loop with second entry Lslow1
LslowEnter:
while (!exitCondition) {
    if (condition1)
        i = f( );
Lslow1:
    BOUNDCHECK(i,A);
        = A[i];
    if (condition2)
        i = g( );
}
```

EXAMPLE 4b

One skilled in the art will, once informed by the disclosure herein, appreciate that other techniques can also be used to deal with unknown updates that occur before the array access like the update performed under condition1 in the example code of Example 4b.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from one or more computer-usable or computer-readable media providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art.

For example, the description herein has been directed to embodiments in which one copy of an uncounted loop has been generated, and one of the uncounted loop and the copy of the uncounted loop omits the at least one target exception check. One skilled in the art, now informed by the disclosure herein, will appreciate the equivalence of creating two copies of the uncounted loop, deleting the original uncounted loop, and omitting the at least one target exception check from one of the copies. Such an embodiment is intended to fall within the scope of the appended claims, and to be covered by the Doctrine of Equivalents and the principles of purposive claim construction.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method, performed by a processor, for compiling a computer program to generate compiled code, comprising the steps of:
based on operations within an uncounted loop, the uncounted loop being a loop for which a number of iterations is not known before the loop begins executing, the uncounted loop contained in input code, the uncounted loop having at least one target exception check, generating, using the processor, one or more calculations for determining, at runtime, for each of the at least one target exception check, an expected number of iterations through which the uncounted loop can iterate prior to the uncounted loop encountering an exception corresponding to a corresponding target exception check;
generating, using the processor, a copy of the uncounted loop, wherein one of the uncounted loop and the copy of the uncounted loop omits each of the at least one target exception check, and wherein an other of the uncounted loop and the copy of the uncounted loop includes each of the at least one target exception check;
compiling, using the processor, the input code to form compiled code; and
arranging, using the processor, within the compiled code the uncounted loop, the copy of the uncounted loop, and the one or more calculations so that at runtime a program flow will enter the one of the uncounted loop and the copy of the uncounted loop and, if a maximum number of iterations of the one of the uncounted loop and the copy of the uncounted loop is reached, the program flow will proceed from the one of the uncounted loop and the copy of the uncounted loop to the other of the uncounted loop and the copy of the uncounted loop, wherein the maximum number of iterations is no more than a smallest member of a set consisting of the expected number of iterations for each of the at least one target exception check; wherein the at least one target exception check is a plurality of target exception checks consisting of a subset of a larger plurality of exception checks contained in the uncounted loop.

2. The computer implemented method of claim 1, wherein the uncounted loop contains an exit condition and the copy of the uncounted loop contains a copy of the exit condition, and wherein within the compiled code, the uncounted loop, the copy of the uncounted loop, and the one or more calculations are arranged so that, responsive to a determination within the one of the uncounted loop and the copy of the uncounted loop and prior to reaching the maximum number of iterations that the exit condition or the copy of the exit condition has been satisfied, the program flow proceeds past the other of the uncounted loop and the copy of the uncounted loop to an instruction intended for execution immediately following execution of the uncounted loop.

3. The computer implemented method of claim 1, wherein the at least one target exception check is a single exception check.

4. The computer implemented method of claim 1, wherein the at least one target exception check consists of all exception checks contained in the uncounted loop.

5. The computer implemented method of claim 1, wherein the uncounted loop is an infinite loop and wherein exit from the other of the uncounted loop and the copy of the uncounted loop is controlled by the at least one target exception check.

6. The computer implemented method of claim 1, wherein the compiled code is executable code.

7. The computer implemented method of claim 1, wherein the maximum number of iterations is smaller than the smallest member of the set consisting of the expected number of iterations for each of the at least one target exception check.

8. A computer program product comprising at least one non-transitory medium having computer-usable program code for compiling a source program to generate compiled code, the computer program product comprising:
computer usable program code for, based on operations within an uncounted loop, the uncounted loop being a loop for which a number of iterations is not known before the loop begins executing, the uncounted loop contained in input code, the uncounted loop having at least one target exception check, generating one or more calculations for determining, at runtime, for each of the at least one target exception check, an expected number of iterations through which the uncounted loop can iterate prior to the uncounted loop encountering an exception corresponding to a corresponding target exception check;
computer usable program code for generating a copy of the uncounted loop, wherein one of the uncounted loop and the copy of the uncounted loop omits each of the at least one target exception check, and wherein an other of the uncounted loop and the copy of the uncounted loop includes each of the at least one target exception check;
computer usable program code for compiling the input code to form compiled code; and
computer usable program code for arranging, within the compiled code, the uncounted loop, the copy of the uncounted loop, and the one or more calculations so that at runtime a program flow will enter the one of the uncounted loop and the copy of the uncounted loop and, if a maximum number of iterations of the one of the uncounted loop and the copy of the uncounted loop is reached, the program flow will proceed from the one of the uncounted loop and the copy of the uncounted loop to the other of the uncounted loop and the copy of the uncounted loop, wherein the maximum number of iterations is no more than a smallest member of a set consisting of the expected number of iterations for each of the at least one target exception check; wherein the at least one target exception check is a plurality of target exception checks consisting of a subset of a larger plurality of exception checks contained in the uncounted loop.

9. The computer program product of claim 8, wherein the uncounted loop contains an exit condition and the copy of the uncounted loop contains a copy of the exit condition, and wherein within the compiled code, the uncounted loop, the copy of the uncounted loop, and the one or more calculations are arranged so that, responsive to a determination within the one of the uncounted loop and the copy of the uncounted loop and prior to reaching the maximum number of iterations that the exit condition or the copy of the exit condition has been satisfied, the program flow proceeds past the other of the uncounted loop and the copy of the uncounted loop to an instruction intended for execution immediately following execution of the uncounted loop.

10. The computer program product of claim 8, wherein the at least one target exception check is a single exception check.

11. The computer program product of claim 8, wherein the at least one target exception check consists of all exception checks contained in the uncounted loop.

12. The computer program product of claim 8, wherein the uncounted loop is an infinite loop and wherein exit from the other of the uncounted loop and the copy of the uncounted loop is controlled by the at least one target exception check.

13. The computer program product of claim 8, wherein the compiled code is executable code.

14. The computer program product of claim 8, wherein the maximum number of iterations is smaller than the smallest member of the set consisting of the expected number of iterations for each of the at least one target exception check.

15. A data processing system comprising:
- at least one processor;
- a bus coupled to the processor;
- at least one computer usable medium coupled to the bus, wherein the at least one computer usable medium contains a set of instructions and wherein the at least one processor is adapted to carry out the set of instructions by causing the data processing system to:
- based on operations within an uncounted loop, the uncounted loop being a loop for which a number of iterations is not known before the loop begins executing, the uncounted loop contained in input code, the uncounted loop having at least one target exception check, generate one or more calculations for determining, at runtime, for each of the at least one target exception check, an expected number of iterations through which the uncounted loop can iterate prior to the uncounted loop encountering an exception corresponding to a corresponding target exception check;
- generate a copy of the uncounted loop, wherein one of the uncounted loop and the copy of the uncounted loop omits each of the at least one target exception check, and wherein an other of the uncounted loop and the copy of the uncounted loop includes each of the at least one target exception check;
- compile the input code to form compiled code; and
- arrange, within the compiled code, the uncounted loop, the copy of the uncounted loop, and the one or more calculations so that at runtime a program flow will enter the one of the uncounted loop and the copy of the uncounted loop and, if a maximum number of iterations of the one of the uncounted loop and the copy of the uncounted loop is reached, the program flow will proceed from the one of the uncounted loop and the copy of the uncounted loop to the other of the uncounted loop and the copy of the uncounted loop, wherein the maximum number of iterations is no more than a smallest member of a set consisting of the expected number of iterations for each of the at least one target exception check; wherein the at least one target exception check is a plurality of target exception checks consisting of a subset of a larger plurality of exception checks contained in the uncounted loop.

16. The data processing system of claim 15, wherein the uncounted loop contains an exit condition and the copy of the uncounted loop contains a copy of the exit condition, and wherein within the compiled code, the uncounted loop, the copy of the uncounted loop, and the one or more calculations are arranged so that, responsive to a determination within one of the uncounted loop and the copy of the uncounted loop and prior to reaching the maximum number of iterations that the exit condition or the copy of the exit condition has been satisfied, the program flow proceeds past the other of the uncounted loop and the copy of the uncounted loop to an instruction intended for execution immediately following execution of the uncounted loop.

17. The data processing system of claim 15, wherein the at least one target exception check is a single exception check.

18. The data processing system of claim 15, wherein the at least one target exception check consists of all exception checks contained in the uncounted loop.

19. The data processing system of claim 15, wherein the uncounted loop is an infinite loop and wherein exit from the other of the uncounted loop and the copy of the uncounted loop is controlled by the at least one target exception check.

20. The data processing system of claim 15, wherein the compiled code is executable code.

21. The data processing system of claim 15, wherein the maximum number of iterations is smaller than the smallest member of the set consisting of the expected number of iterations for each of the at least one target exception check.

* * * * *